Jan. 4, 1938. S. A. ROMEO 2,104,245
VEHICLE SPRING SUSPENSION
Filed Jan. 19, 1937
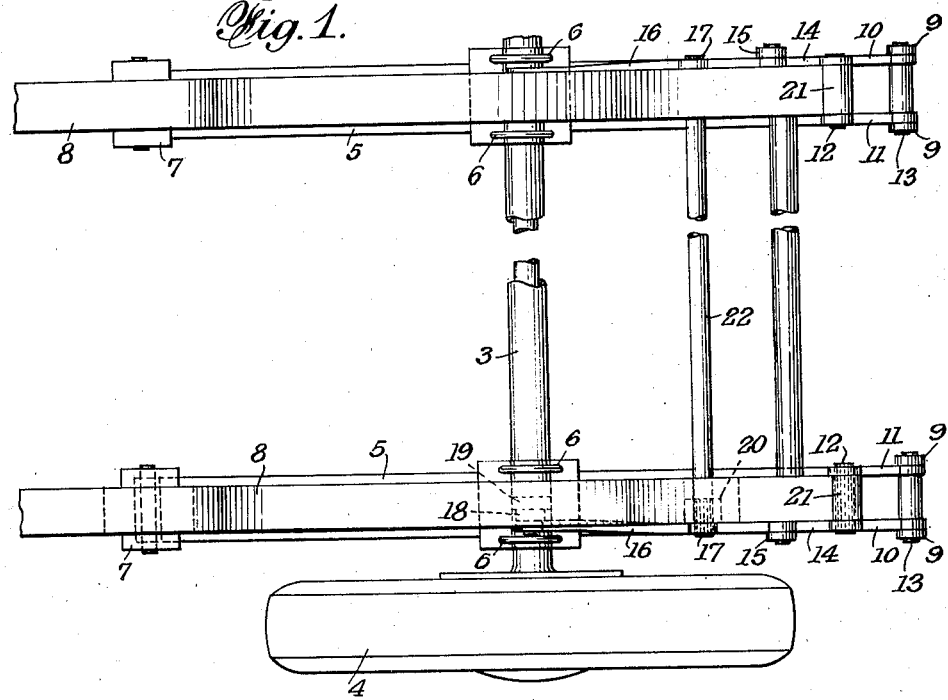
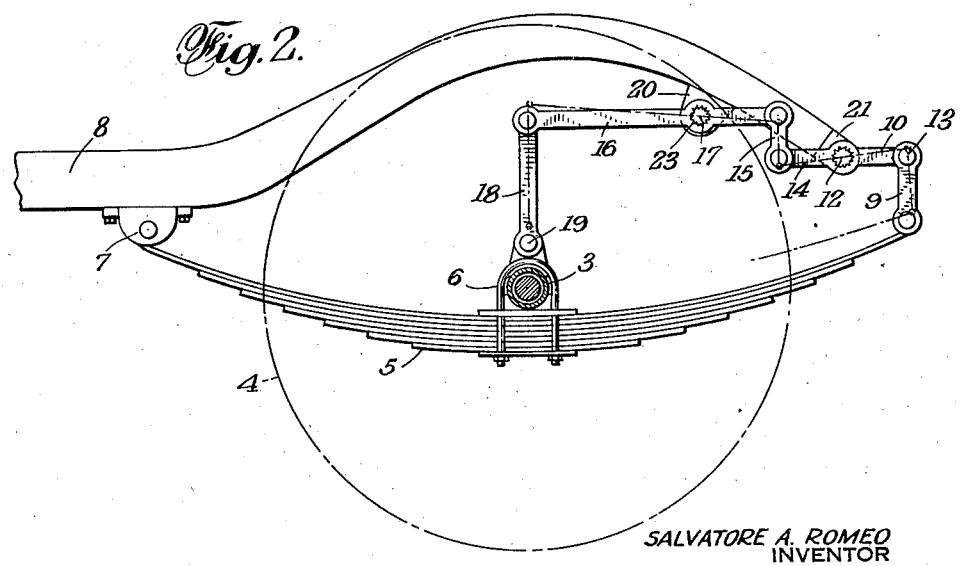
SALVATORE A. ROMEO
INVENTOR Patented Jan. 4, 1938

2,104,245

UNITED STATES PATENT OFFICE 2,104,245

VEHICLE SPRING SUSPENSION

Salvatore A. Romeo, Brooklyn, N. Y.

Application January 19, 1937, Serial No. 121,249

1 Claim. (Cl. 267—19)

This invention relates to the spring suspension of vehicles, particularly motor vehicles.

Special objects of the invention are to render the springs more effective for cushioning the movements of a vehicle body and for absorbing road shock and to provide a simple, practical and desirable construction for such purposes, which may be readily applied to existing motor vehicles.

Further objects and the novel features of construction, combinations and relations of parts by which all such objects are attained are set forth or will appear hereafter.

The drawing accompanying and forming part of the following specification illustrates a practical commercial embodiment of the invention, but it should be understood that the structure may be modified and changed in various ways all within the true intent and broad scope of the invention as hereinafter defined and claimed.

Figure 1 is a broken plan view of the invention as incorporated in a motor vehicle suspension.

Figure 2 is a broken side elevation of such parts.

In the present disclosure, the invention is shown applied to a rear axle suspension, but this is by way of illustration as it may be applied as well to front axle suspension.

Referring to the drawing in detail, a rear axle and road wheel are indicated at 3, 4 and a typical supporting spring 5 is shown clipped at its central or intermediate portion to the axle at 6 and shackled at its forward end at 7 to the side member 8 of the chassis or body frame.

The rearward end of the spring is shown connected by pivoted parallel shackle links 9 with the rearward ends of parallel levers 10, 11, fixed on the opposite ends of a pivot bolt 12 operating in a bearing provided in the end of the frame and carrying the pivot bolt 13 for the upper ends of shackle links 9.

The spring shackle lever 10 is shown as having a forwardly extending arm 14 connected by pivot link 15 with the rearward arm of a lever 16 pivoted intermediate its ends on the frame at 17 and having its forward end connected by pivot link 18 with a bracket 19 on the axle.

The intermediate bearing 17 for the forward lever 16 is shown as carried by a fulcrum bracket 20 fixed to the frame and this, as well as the mountings and connections for the other parts, is shown positioned so that the levers 16 and 14—10 will lie close against the side of the frame, out of the way of other parts.

The load of the vehicle body is transmitted to the spring through the connections at 7 and 9 between the body and the opposite ends of the spring. The spring shackle links 9 are thus under compression and the tendency, therefore, is to rock the parallel levers 10, 11 upwardly and the forward extension 14 of these levers downwardly, causing link 15 to act as a tension link drawing the rearward end of lever 16 downwardly and rocking the forward end of lever 16 upwardly to the extent permitted by link 18, also under tension, connected to the axle. Upward movement of the axle, therefore, relieves the downward pull of link 18, permitting the forward end of lever 16 to rock upwardly and the rearward end of this lever to rock downwardly, causing link 15 to then permit downward movement of leverage extension 14 and upward movement of levers 10, 11, thus raising the pivot bolt 13 for the rearward spring shackle connections.

Accordingly, the tendency is to automatically compensate for road shocks and to in effect "float" the supported vehicle body in a relatively smooth, more or less state of equilibrium.

The invention may be readily applied to existing motor vehicles by simply providing or attaching the fulcrum brackets 20 to the frame and, if not already present, suitable anchorage brackets 19 to the axle. The bearings 21 usually provided at the ends of the frame for the upper ends of the spring shackle bolts, may be used as the bearings for the second lever fulcrums 12, or if necessary or desirable, special brackets for carrying the fulcrum bolts 12, may be attached to the bearings 21. The two levers may be of flat construction, lying close against the side of the frame in the end to end overlapping relation shown, where they are out of the way but can readily be reached, as for lubrication, inspection or repair purposes.

The structure may require modification for use with different types of motor vehicles and the specification and claim are accordingly intended to cover such possibilities, the terms employed being used in a descriptive rather than in a limiting sense, except possibly as limitations may be imposed by state of the prior art.

While the long arm lever 16 is shown directly connected with the axle, it is possible that it may be indirectly connected thereto as by being connected with the spring at one side of the axle.

The invention is well adapted to providing a stabilizer effect by connecting the levers at opposite sides of the frame through a torsional equalizer rod or tube. In the present illustration, the pivots 17 for levers 16 are actually the ends of a torsion rod 22 journaled in bearings 20 on the frame and having the levers 16 fixedly secured on the ends of the same as indicated at 23 in Figure 2. In place of or in addition to torsion rod 22, the pivots 12 of the second levers 14—10 may be similarly extended and connected. With one or the other or both sets of the levers connected by a torsion element or elements, the movements at one side are to an extent counterbalanced, equalized and cushioned, through the torsional connection or connections by movements at the opposite side.

The invention may be readily applied to existing motor vehicles, without altering wheel centers or other more or less standardized dimensions and without materially changing present constructions. Ball bearings, roller or tapered roll bearings may be employed to carry the loads, particularly at the centers 12, 23 and 13. The proportions, particularly of the levers 16, 14—10 may be varied to suit particular constructions and weights. The form of these levers also may alter with different designs of cars. Thus, for lighter cars, the rearward arm 10 of the second lever may be single instead of the double armed construction shown in Figure 1 at 10, 11. Many other modifications may be made, as required or found desirable, all within the true intent of the present invention.

As the connections between the two levers and between the forward lever and the axle, at 15, 18, are merely tension links, these can be made quite flat and thin so as to take up very little space at the side of the frame and between the frame and axle.

I claim:

A vehicle spring suspension, comprising in combination with vehicle frame, axle and supporting spring, said spring being connected intermediate its ends with said axle and connected at one end with said frame and means for connecting the other free end of said spring with the frame, including two substantially straight and generally parallel levers in end-to-end relation pivoted intermediate their ends one above the other on said frame and with the inner end of the inner lever over the axle and the outer end of the outer lever over the free end of the spring, substantially vertically arranged free swinging shackles connecting said inner end of the inner lever with the axle and said outer end of said outer lever with the free end of said spring and a substantially vertically disposed free swinging shackle connecting the outer end of the inner lever with the inner end of the outer lever.

SALVATORE A. ROMEO.